July 11, 1950 — A. H. HACKEROTT — 2,514,861
POWER LAWN MOWER
Filed Jan. 2, 1946 — 2 Sheets-Sheet 1

Inventor
Auldin H. Hackerott
By Clarence A. O'Brien
and Harvey B. Jacobson
Attorneys July 11, 1950 A. H. HACKEROTT 2,514,861
POWER LAWN MOWER
Filed Jan. 2, 1946 2 Sheets-Sheet 2

Inventor
Auldin H. Hackerott

By *Clarence A. O'Brien
and Harvey B. Jacobson*
Attorneys

Patented July 11, 1950

2,514,861

UNITED STATES PATENT OFFICE 2,514,861

POWER LAWN MOWER

Auldin H. Hackerott, Natoma, Kans.

Application January 2, 1946, Serial No. 638,617

2 Claims. (Cl. 56—25.4)

My invention relates to power lawn mowers, and the object of the invention is to provide a machine of this character employing a series of cutting blades and mounted on a belt adapted to be driven in high speed, so as to efficiently cut and sever grass and weeds as the same is driven across the front of the machine frame during the advance of the machine.

Another object of the invention is to provide a novel power lawn mower, in which steel blades for cutting vegetation such as grass and weeds, are mounted upon a novel form of belt which eliminates the necessity of employing the usual sickle guard fingers, thereby eliminating a great deal of the weight and much friction, as well as vibration which usually results therefrom, and also providing for cutting action which is accomplished by impact of the sharp edges of the cutting blades with the vegetation instead of by a shearing action.

Another object of the invention is to provide a power lawn mower which may employ a relatively simple and light frame structure and which is adapted to drive an endless belt carrying the cutting blades, means being provided to maintain the belt under tension and taut by adjustment of the pulleys around which the same operates, so that efficient driving and cutting action will result, and also to provide means for regulating the height of the cut as the machine is advanced or propelled and guided from a handle at the rear of the machine.

Another object is to eliminate the use of shear plates or guards for the cutting knives to pass through or register with, thus obviating obstruction to the travel of the cutter belts freely together with the blades thereon, thus providing for freedom from vibration and rendering it possible in case one or more of the cutting knives are injured due to contact with some obstruction on the ground, to readily replace the same.

Another object of the invention is to provide a power lawn mower, which will cut up to a side wall or any other straight object which the conventional rotary lawn mower will not do, owing to the advance of the wheels in front of the usual spiral cutting blades thereof, thus eliminating the necessity for trimming, the elimination of the shear plate or guard fingers also rendering the machine relatively light and eliminating the steel to steel action required thereof and obstructions and disrepair often resulting therefrom, thereby reducing friction to a minimum, alowing for much wider cut with the same power and much longer useful life, as well as being economical to manufacture and sell.

Other objects and advantages reside in the details of construction and operation as more fully hereinafter described and claimed, reference being had to the accompanying drawings forming part hereof, wherein like numerals refer to like parts throughout, and in which:

Figures 1, 2:
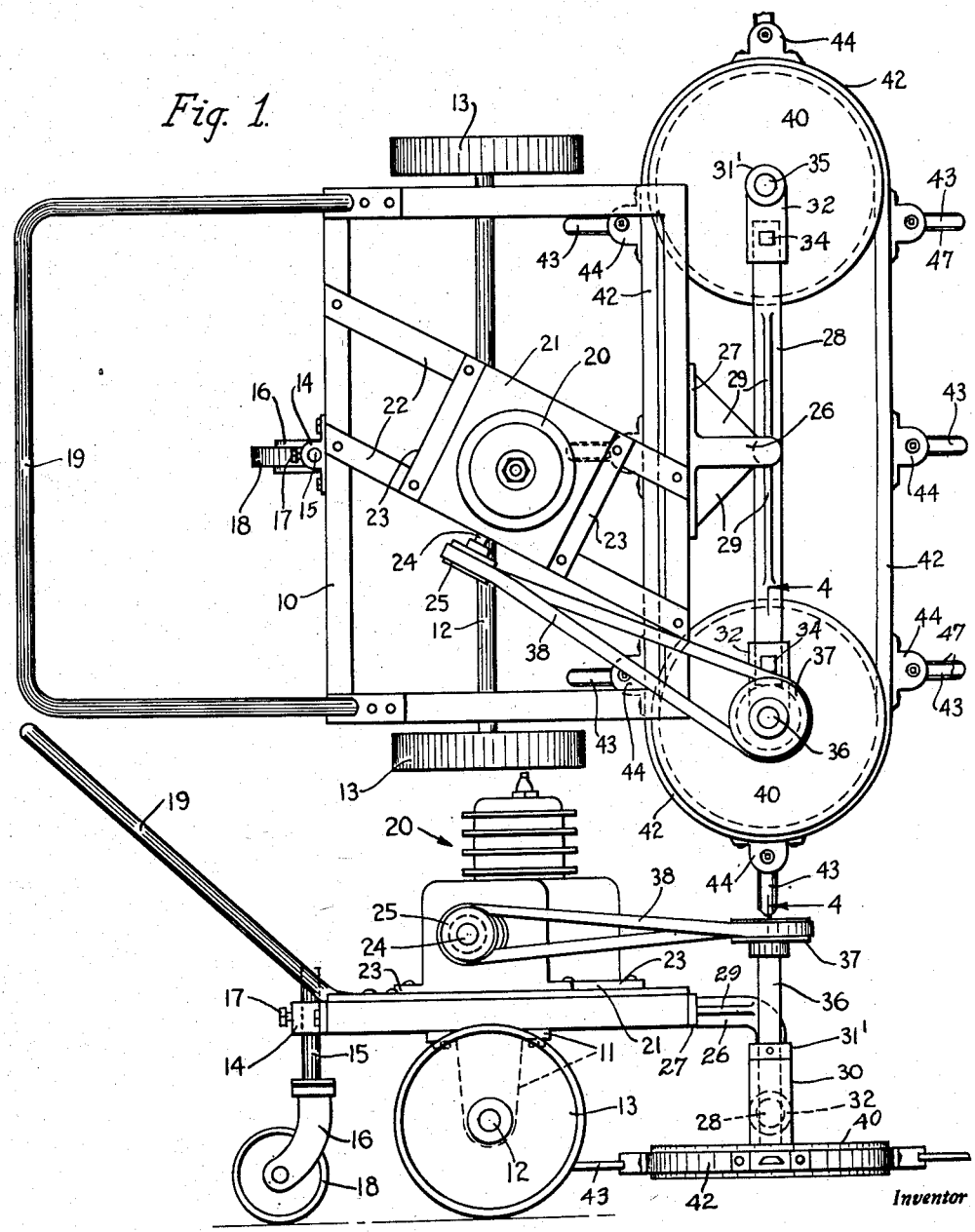
Figure 1 is a top plan view of a power lawn mower constructed in accordance with the invention.
Figure 2 is a side elevation of the lawn mower.
Figure 3:
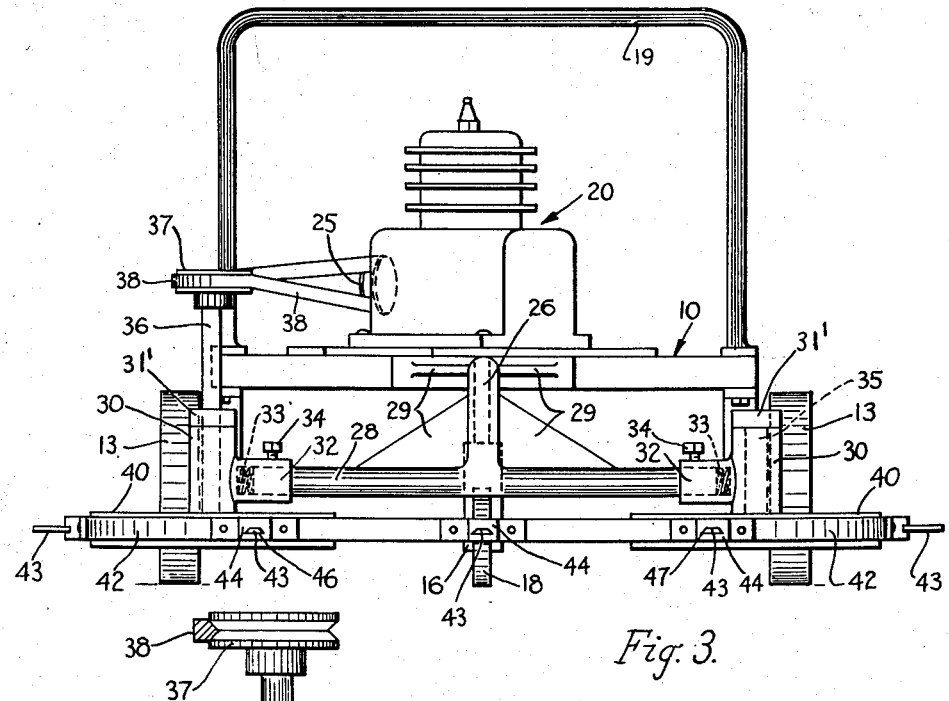
Figure 3 is a front elevation of the lawn mower.

Referring to the drawings in detail, my power lawn mower is shown as comprising a wheeled frame 10 forming a horizontal raised platform of rectangular outline having front, side and rear portions running horizontally. This frame is formed of suitable bars welded, bolted or otherwise joined at the ends thereof with depending hangers or bearings 11 and supporting an axle 12 on which ground wheels 13 are mounted intermediately of the front and back of the frame. The back of the frame also supports a bearing strap 14 in which the vertical spindle 15 of a fork 16 is mounted and adapted to be tightened by means of a set-screw 17 although the same may be held stationary. A caster wheel 18 is journaled in the fork 16 to support the rear end of the machine when advanced across the ground and permits the same to take uneven surfaces efficiently. Also, the vertical adjustment provides means for raising or lowering the front end of the machine, and thus the cutting mechanism, so as to adjust the height of the cut in that when the rear end of the machine is raised, by the adjusting device consisting of the screw 17, which is loosened for this purpose, the front end and cutting blades are lowered and vice versa. The machine is also provided with an upwardly and rearwardly extending U-shaped handle member 19 extending from the rear portion of the frame and having the legs bolted or welded to the sides of the frame to provide an efficient and rigid attachment which is both strong and durable and so that the operator standing at the rear of the machine may readily advance, guide or pull the same backwards.

Figure 4:
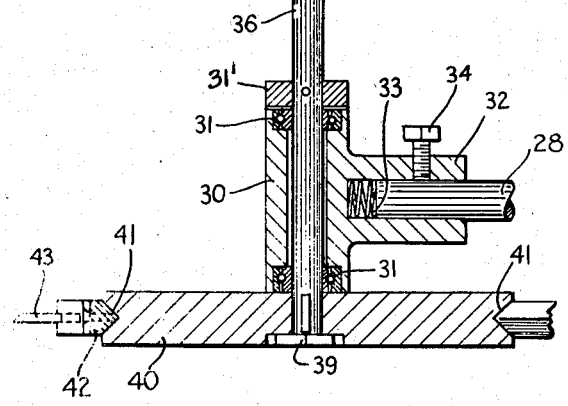
Figure 4 is an enlarged fragmentary detail vertical sectional elevation through one end of the machine taken on the line 4—4 of Figure 1.
Figure 5:
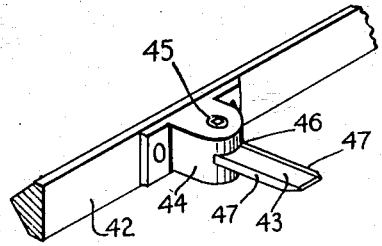
Figure 5 is a fragmentary perspective view of a portion of the endless V-belt employed and showing a mounting of the cutting blades thereon for convenient renewal or repair.

Power for driving the cutting mechanism, consists of an air cooled motor or internal combustion engine 20 which is preferably mounted diagonally on top of the frame 10 and shown supported upon a base 21 mounted on diagonal cross bars 22 extending between the front and back bars of the frame 10 and connecting bars 23 between and connecting the bars 22. The drive shaft 24 of the motor or engine, has a pulley 25 affixed thereto, and provided with a V-shaped groove in its periphery formed by outwardly divergent sides. A depending T-shaped hanger 26 is provided at the front of the frame intermediate the ends thereof, the same having a vertical portion 27 welded or bolted to the vertical face of the front cross bar of the frame and extending forwardly and downwardly with its lower end provided with a transverse horizontal supporting bar 28 which like the vertical attaching plate 27 may be reinforced with triangular or other webs 29 at each side of the hanger 26 at its horizontal and vertical portions bent downwardly from the horizontal forwardly projecting portion. The ends of the bar 28 serve to support the vertical bearing sleeves 30, which may be provided with anti-friction bearings 31 at the top and bottom thereof. These bearings are also formed with inwardly extending horizontal sleeves or sockets 32 which are sleeved in telescopic relation to the end portions of the bar 28 as more particularly seen in Figure 4 of the drawings. If desired, the bores of the sockets 32 may be loaded with springs 33 to maintain the same under compression and tight when fastened by suitable binding means such as set-screws 34. This provides for adjustment of the length of the bar and the distance between the bearings 30, for tightening the endless belt on which the cutters are mounted, as will be later described. Collars 31' and one of the bearings 30 support a short shaft 35 at one side of the machine, and the other supports a vertically extended longer shaft 36 on the upper end of which, a pulley 37 is fixed also having a V-shaped groove in its periphery. An endless drive belt 38 of V-shaped cross section or having an inner V-shaped portion to fit the groove of the pulleys 25 and 37, is trained around said pulleys with the runs thereof crossed inasmuch as the pulley 25 is disposed vertically on the horizontal motor shaft 24 of the air cooled internal combustion or gasoline engine, or other suitable source of power, which may be an electric motor and extension cord or cable, and the horizontal pulley 37 mounted on the upper end of the vertical shaft 36.

The lower ends of the shafts 35 and 36 have fixed thereto against downward displacement, as shown at 39, larger pulleys 40 also having V-shaped grooved peripheries as indicated at 41. Around these pulleys, which may be termed idler pulleys, is an endless belt 42, preferably of rubber or other similar material of V-shaped cross section or having its inner portion V-shaped or with inwardly converging top and bottom sides, to snugly fit the grooves 41 of the pulleys 40. Attached to the outer face of the belt 42, as by rivets, bolts or the like are cutting blades or knives 43, shown mounted in extensions 44 which may be of metal, rubber or the like and riveted, bolted or vulcanized as a part of the belt 42. These extensions or ears 44 have vertical bores 45 and notches or slots 46 leading from the outer face thereof across the bores so that the blades 43 having opposite cutting edges 47 at the sides thereof, may be inserted at their inner ends and firmly anchored by pins inserted through apertures in said inner ends and through the bores 45, or the blades may be anchored therein by riveting, bolting, vulcanizing or welding. Since the pulleys 40 mounted on the lower ends of the shafts 35 and 36 extend outwardly from the sides of the frame and ground wheels, the belt and cutter operate outwardly thereof and beyond the sides of the frame, so as to give a wide cut with the same power, as compared to the ordinary lawn mower or others heretofore produced. It will also be noted, that by adjustment of the bearings 30 on the ends of the horizontal bar 28 at the sockets 22, the slack in the belt may be taken up so that the same may be maintained tight or taut at all times with rectilinear or straight laps of the belt 42 between the pulleys at the front giving a wide straight swath in cutting the grass, weeds or other vegetation as the belt is driven at high speed from the prime mover or motor, which as previously stated is preferably an air cooled gasoline engine. Also, since the cutting belt and blades operate at high speed such as between 6,000 and 10,000 feet per minute surface speed, and also because the cutters may operate in either direction due to the sharp cutting edges being disposed on opposite sides thereof, the same will cut clean without any kind of guard or shear plates, thereby eliminating friction, obstruction and vibration usually resulting from such sickle bar type of cutter. This will also render the device lighter in weight and more economical to manufacture and sell.

While in the foregoing there has been shown and described the preferred embodiment of this invention it is to be understood that minor changes in the details of construction, combination, and arrangement of parts may be resorted to without departing from the spirit and scope of the invention as claimed.

I claim:

1. In a power lawn mower having a frame and a horizontal endless belt carrying cutting blades mounted on the outer face thereof, means for mounting said belt comprising a horizontal bar disposed transversely of and across the front of said frame, a pair of bearings having sleeves frictionally engaged on the ends of said bar, springs compressed between end faces of said bar and adjacent portions of said bearings, and pulleys carrying said belt and having vertical shafts rotatably mounted in said bearings, said bearings being supported and biased in opposite directions to preserve proper tension in said belt.

2. In a power lawn mower, a frame, a horizontal bar rigidly fixed on said frame and extending across the front of the mower, bearing members having sleeve portions slidably mounted on the ends of said bar and having vertical shafts, pulleys mounted on said shafts at the lower ends thereof, a source of power mounted on said frame, one of said shafts extending upwardly and being operatively connected with said source of power, an endless belt entrained over said pulleys, coiled springs within said sleeve members and compressed between the ends of the bar and portions of the bearing members to bias said bearing members away from the ends of the bar so as to tighten said belt, anchoring members secured in spaced relation on the outside of said belt and having transverse slots therein, cutting blades of elongated plate character having one end of each secured in one of said slots, and means for securing the blades in said slots.

AULDIN H. HACKEROTT.

REFERENCES CITED

The following references are of record in the file of this patent:

UNITED STATES PATENTS

| Number | Name | Date |
|---|---|---|
| 689,533 | Baringer | Dec. 24, 1901 |
| 1,039,161 | Maurer et al. | Sept. 24, 1912 |
| 1,364,251 | Cook | Jan. 4, 1921 |
| 1,760,939 | Emerson | June 3, 1930 |
| 2,186,126 | Roll | Jan. 9, 1940 |
| 2,245,821 | Poynter | June 17, 1941 |